Figure 1:
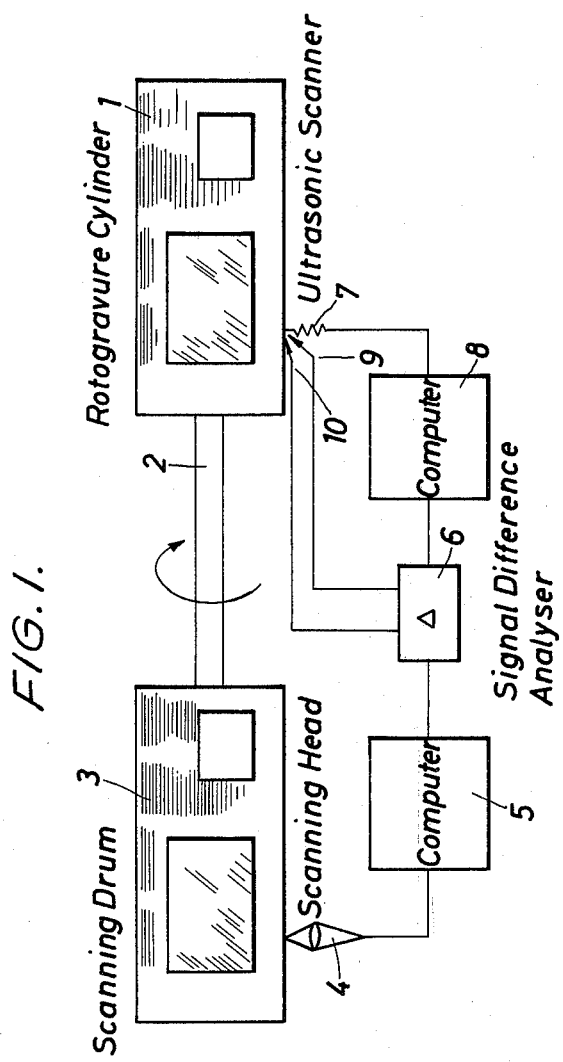

United States Patent
Dini

[11] 3,885,422
[45] May 27, 1975

[54] METHOD FOR THE EXAMINATION OR INSPECTION OF ROTOGRAVURE PRINTING CYLINDERS OR THE LIKE

[75] Inventor: Mamiliano Dini, Brescia, Italy

[73] Assignee: European Rotogravure Association, Munich, Germany

[22] Filed: June 19, 1973

[21] Appl. No.: 371,467

[30] Foreign Application Priority Data
June 21, 1972 Germany............................ 2230350

[52] U.S. Cl.............................. 73/67.8 S; 96/36.3
[51] Int. Cl. .......................................... G01n 29/00
[58] Field of Search............ 73/67.7, 67.8 R, 67.8 S, 73/67.9; 356/157, 158; 33/125 W; 96/36.3

[56] References Cited
UNITED STATES PATENTS
3,349,609  10/1967  Ryzhou-Nikonov et al. ........ 73/67.9

FOREIGN PATENTS OR APPLICATIONS
117,892  6/1958  U.S.S.R............................... 73/67.8

*Primary Examiner*—Richard C. Queisser
*Assistant Examiner*—John P. Beauchamp
*Attorney, Agent, or Firm*—Cushman, Darby & Cushman

[57] ABSTRACT

A method of examining cells formed in the surface of a rotogravure cylinder. The depth of the etched or otherwise formed cells in the cylinder surface is monitored by sensing the magnitude of reflected ultrasonic beam signals where the incident ultrasonic beam is directed at substantially 90° with respect to the sidewall of the cell. In addition, a standard pattern such as a photographic negative or the like is scanned to obtain a measure of the desired depth for the cells in respectively corresponding areas of the etched cylinder surface. The measured actual cell depth is synchronously compared with the desired cell depth in a signal difference analyzer which provides an indication whenever the actual cell depth is greater or less than the desired cell depth. This indication may take the form of a selective color spray mark directly upon the respectively associated area of the cylinder surface.

10 Claims, 2 Drawing Figures

METHOD FOR THE EXAMINATION OR INSPECTION OF ROTOGRAVURE PRINTING CYLINDERS OR THE LIKE

The invention relates to a method of examining the cells formed in the surface of a rotogravure cylinder or the like, especially for use in the production of rotogravure printing cylinders by etching.

In the production of rotogravure cylinders to be used in an intaglio printing process, a plurality of closely adjacently spaced cells or cup-shaped pits is formed in the cylinder surface by electro-mechanical means or by means of an etching process. When engraving rotogravure cylinders by means of an etching process, the cells or cup-shaped pits are applied in a pattern defined by the screen ruling. During the printing operation, the cells formed in this or in a similar manner receive the printing ink and establish varying intensities of color shade depending on their volume, so that a desired pattern including respective variations of color tone intensity can be produced. Thus, the intensity of the print depends on the quantity of printing ink contained in the individual cells, i.e. on the section area and/or the depth of the cells. Therefore, it is of principal importance in the production of the rotogravure cylinders that the cells to be formed have exact depth and provide a faithful color reproduction of the image of an original so that reproductions produced by rotogravure cylinders as closely as possible resemble the original with respect to color composition and color intensity.

Both in the electro-mechanical engraving of rotogravure cylinders, preferably consisting of copper, which is generally performed by means of a diamond stylus which engraves cells of varying depth in the surface of the rotogravure cylinders depending on the energy applied to the system, and in the etching process, it has heretofore been customary to inspect and sense the engraved cells with respect to their depth or their volume by means of a microscope. Furthermore, it is possible to scan and record the profile of a predetermined number of cells by using profile recorders and with the aid of a special stylus. The values obtained in this way are then compared with an empirically established scale of values in order to determine whether the examined cells have the necessary depth. However, these measuring methods are extremely cumbersome and time consuming, because there are usually made test or proof prints of the rotogravure cylinders, and the thus obtained reproductions are compared with an original. The areas of the reproduction which do not exactly correspond to the original with respect to the color intensity are marked on the rotogravure cylinder in order to identify the area of which the cells require correction. Thereafter, cells of too great a depth are filled up again, preferably by additional local galvanizing, and cells of too small a depth are either etched or engraved by mechanical means.

For the production of test prints, the rotogravure cylinder must be mounted on a test press after each correction step; this reassembling is repeated until the reproductions obtained correspond to the original or pattern, respectively. In general, films or papers are used as the reproduction material. Obviously, this mode of operation requires great expense of time and, further, has the disadvantage that the test press must be present for the production of test prints in addition to the printing press. Finally, the production of test prints involves a relatively great expense of material as far as printing ink and paper are concerned.

Accordingly, it is an object of the invention to provide a method of examining the cells formed in the surface of rotogravure cylinders or the like, which method avoids the disadvantages of the heretofore known methods of examination. This method should be automated by means of computers and an automatic evaluation or interpretation means.

In a method of examining the cells formed in the surface of a rotogravure cylinder or the like, especially for use in the production of rotogravure printing cylinders by etching, in which method cells are formed in at least two regions of the surface of said material layer, which cells each have one of their side walls or a portion of one of their side walls extending under the same angle relative to the surface of said material layer, whereby all of these side walls or side wall portions extend parallel to each other and whereby all of the cells of any region each have identical depths but the cells of adjacent regions have different depths, whereby said regions are scanned individually and successively by a bundle of ultrasonic beams which is projected onto the surface of said material layer, in a plane perpendicular to said side walls or side wall portions and under an angle $\theta$ with said surface; wherein the intensity of the partial bundle reflected from the bottom and from said wall or wall portion of each cell of the respectively scanned region and extending parallel to the incident beam is measured while the beams reflected from all other flat surfaces are ignored, and wherein the intensities of the reflected partial bundles are compared with a reference value, this object is solved in that an ultrasonic scanner produces a signal corresponding to the measured depth of said cells, which signal is applied to a computer; that a scanning drum provided with a pattern is scanned by means of a scanning element in such manner that the area scanned on the original with respect to area and position corresponds to the area sensed by said ultrasonic scanner on the rotogravure cylinder; that the signal provided by said scanning element is applied to a second computer and the output signals of said two computers are then compared with each other in a signal difference analyzer; that the difference formed by said analyzer is substantially zero when the cells of said rotogravure cylinder scanned by said ultrasonic scanner provide a signal corresponding to the reference value of the pattern produced by said scanning element, while the difference is unequal to zero when the signal produced by said ultrasonic scanner does not correspond to said reference value and the cells are engraved too deep or too shallow in comparison with the value established by said pattern; and that a monitor means is activated when the difference formed by said analyzer is unequal to zero.

By means of the method according to the invention, the surface of rotogravure cylinders or the like receiving the printing cells may be examined or compared with an original, respectively, in substantially more simple and more rapid manner. The rotogravure cylinder may be examined directly at the place where the printing cells are formed. Reassembling from an engraving or etching apparatus into a testing or proofing press as well as the production of test prints are not necessary. In this manner, substantial savings in time and material can be obtained in comparison with the conventional methods.

In the following, the method according to the invention is explained in greater detail by means of drawings.

Figure 2:
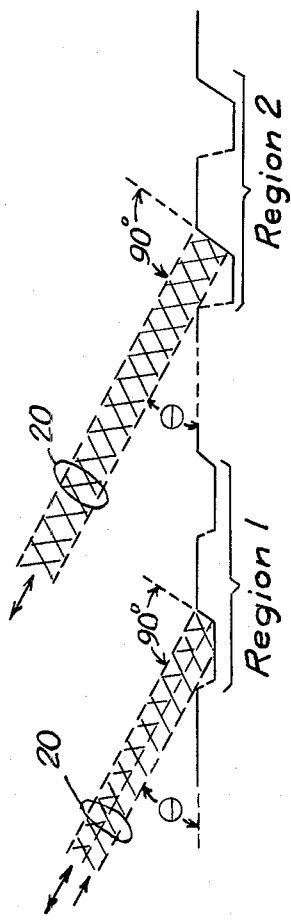

FIG. 1 schematically shows an example of a preferred measuring or sensing assembly by means of which the examination may be performed; and FIG. 2 schematically illustrates the ultrasonic scanning of the rotogravure cells so as to sense cell depth.

Preferably, a rotogravure cylinder 1 processed in accordance with an etching process or an electromechanical method is mounted for rotation through a shaft 2 with a scanning drum 3 the surface of which either directly serves as the original or is provided with an original. A positive or negative transparency may serve as the original which establishes the printing intensity or the color distribution which the reproductions produced by the rotogravure cylinder should show up.

Preferably, the original of the scanning drum 3 is scanned for its density values by an optical scanning head 4; the signal produced by the scanning head is transmitted to a signal difference analyzer 6 through a computer 5. In addition to the signal provided by the computer 5, the signal difference analyzer 6 receives a second signal, also transmitted through a computer 8 and produced by an ultrasonic scanner 7, which signal is provided by scanning of the rotogravure cylinder for example in accordance with the ultrasonic measuring or sensing method according to U.S. Pat. No. 3,808,878 by applicant.

The ultrasonic scanning technique previously described in the introductory portion of the specification is illustrated in FIG. 2. As will be seen, the incident beam of ultrasonic radiation 20 is directed at an angle $\theta$ with respect to the surface of the cylinder while being at substantially 90° or perpendicular with respect to the sidewall of the cells in both regions 1 and 2. As also indicated in FIG. 2, only a portion of the incident beam is returned back along the path of the incident beam, namely, that portion of the beam which is incident upon the sidewall of the cells in region 1. The remainder of the beam is incident on a surface which reflects the incident radiation at an angle other than directly back towards the ultrasonic scanner and, accordingly, this portion of the beam is effectively ignored in region 1. However, when cells of greater depth such as shown in region 2 are encountered, a greater proportion or perhaps all of the incident ultransonic radiation is returned to the ultrasonic scanner along the path of incidence. Accordingly, as should be appreciated, the amount of incident ultrasonic energy which is reflected directly back along the path of incidence is related to the depth of the scanned cells.

In both computers 5 and 8, the signals transmitted thereto by the respective scanning elements, i.e. by the scanning head 4 and the ultrasonic scanner 7, are coordinated with each other both with respect to time and with respect to their signal shape, so that the two signals may be compared with each other. When using different scanners or sensors 4 and 7, there may be present a time difference between the occurence of the signals applied by these elements to the computers 5 and 8, respectively, which difference may be compensated by the computers, too.

By using computers, it is also possible to invert the signals so that positives or negatives may be selectively used as the pattern. It is only necessary to pay attention to the fact that the signals provided by the two sensors, after conversion, are in suitable form to be compared in the respectively associated analyzer.

The circuit arrangement comprised by the computers 5 and 8 and by the signal difference analyzer is designed such that, when there is present a difference between the output signals provided by the computers, monitors 9, 10 or other components are activated, which components, e.g. by means of ink sprays spraying inks of different color indicate the region or regions on the cylinder 1 where the cells are too deep or too shallow. Also, there may be provided monitors which indicate both the place of the requisite correction and the necessary correction proper.

At the monitors, there are provided e.g. ink spray elements which produce two or more beams of different colors in the case of a signal difference between the outputs of the two computers 5 and 8, and which directly indicate on the rotogravure cylinder 1 the place and the necessary correction. In this manner, the manual reworking may be effected directly.

The scanning drum receiving or representing the original or pattern, respectively, is preferably rotated at the same rate of speed as the rotogravure cylinder so that there exists exact correspondence between the surface areas scanned by the scanning head 4 and the ultrasonic scanner 7, or so that the areas of the original which actually correspond to the scanned surface area of the rotogravure cylinder 1 are sensed or examined, respectively. For example, the two cylinders may be positioned in parallel with each other; in either case, it has to be secured only that always the same surface areas of the original or pattern, respectively, and of the rotogravure cylinder which correspond to each other, are scanned both in line and in column directions. Apparently, the diameter of the scanning drum therefore need not be equal to that of the rotogravure cylinder so that there may be used originals the scale of which does not correspond to that of the surface of the rotogravure cylinder; in such case, the difference in scale between the original and the surface of the rotogravure cylinder must be compensated for by the circuit arrangement, which does not involve any difficulties with the conventional computer elements.

As the scanning head 4, there may be used an element corresponding to the ultrasonic scanner 7 the signal of which is transmitted to the computer 5. However, it is more advantageous to use as the scanning head an optical element which directs a focused light beam to the original and which applies to the computer 5 a signal proportional to the intensity of the reflected light. Preferably, a conventional densitometer may be employed as the scanning head.

The measuring or sensing assembly is constructed in such manner that the ultrasonic scanner provides a signal, preferably in timed correspondence with the scanning head 4, whereby the scanned surface areas — as mentioned above — must correspond to each other.

The difference analyzer 6 does not produce an output when the signals provided by the computers 5 and 8 are of equal magnitude so that the monitors 9 and 10 are not activated; on the other hand, in the case of a signal difference, i.e. in the case of cell depths or cell volumes to be corrected, the monitors 9 and 10 are controlled in the above-indicated way.

As mentioned above, there may be used monitors which, in addition to the cells to be corrected, at the same time also show the value or correction. For example, the value of correction is positive when the color intensity signal transmitted from the computer 8 exceeds the reference value provided by the computer 5; correspondingly, the value of correction is negative when the output of the computer 8 is smaller than the reference value of the computer 5. The positive or negative, respectively, value of correction may be directly transmitted to the rotogravure cylinder by means of a pair of beams of different colors. Whenever the signals compared at the signal difference analyzer are exceeding prefixed tolerances then ink injectors are activated, i.e. using red ink when the signal difference is positive or blue ink when the signal difference is negative.

For the examination of the rotogravure cylinder 1, a numerical indication to the monitors 9 and 10 may be used which shows the positive or negative, respectively, value correction, while at the same time the respective cell is indicated on the rotogravure cylinder by means of a colored ink spot. The method according to the invention may, but need not, be practiced directly at the place of production of the rotogravure cylinder.

Although the method according to the invention is explained above in connection with a specific measuring or sensing assembly, of course, numerous modifications or changes may be made without departing from the scope of the invention.

What I claim is:

1. A method of examining cells formed in the surface of a rotogravure cylinder, particularly for use in the preparation of rotogravure cylinders by etching, in which method cells are formed in at least two regions of the surface of said material layer which cells each have one of their side walls or a portion of one of their side walls extending under the same angle relative to the surface of said material layer, whereby all of these side walls or side wall portions extend parallel to each other and whereby all of the cells of any region each have identical depths but the cells of adjacent regions have different depths, said method comprising:

scanning said regions individually and successively with a bundle of ultrasonic beams which are projected onto the surface of said material layer, in a plane perpendicular to said side walls or side wall portions and at an angle $\theta$ with said surface, measuring the intensity of the partial bundle reflected from the bottom and from said wall or wall portion of each cell of the respectively scanned region and extending parallel to the incident beam and ignoring the beams reflected from all other flat surfaces, and producing a signal corresponding to the actual depth of said cells, scanning a drum provided with a pattern by means of a scanning element in such a manner that the area scanned on the pattern with respect to area and position corresponds to the area sensed by said ultrasonic scanner on the rotogravure cylinder and producing a signal representative of the desired cell depth;

comparing the signals representing actual cell depth and desired cell depth with each other in a signal difference analyzer such that the difference output formed by said analyzer is substantially zero when the cells of said rotogravure cylinder scanned by said ultrasonic scanner provide a signal corresponding to the reference value of the pattern produced by said scanning element, while the difference is unequal to zero when the signal produced by said ultrasonic scanner does not correspond to said reference value, and the cells are engraved too deep or too shallow in comparison with the value established by said pattern, and activating a monitor means when the difference formed by said analyzer is unequal to zero.

2. The method according to claim 1, wherein said second-mentioned scanning step comprises scanning an original rotogravure cylinder with a second ultrasonic scanner as the pattern.

3. The method according to claim 1, wherein said second-mentioned scanning step comprises scanning a positive or a negative image with an optical scanning head as the pattern wherein light beams are directed onto said pattern and color density-dependent signals are relected from said pattern.

4. The method according to claim 1, wherein said monitor means, when activated, directly mark those cells of said rotogravure cylinder the depth of which is to be corrected.

5. The method according to claim 4, wherein said monitor means emit at least two sprays of different colors to the cells to be corrected, and indicate by the color whether said cells are wrongly engraved, i.e. too deep or too shallow.

6. The method according to claim 4, characterized in that said monitor means provide said correction values via an indication means.

7. The method according to claim 1, characterized in that said scanning drum and said rotogravure cylinder are synchronized so that the scanned lengths on both are equivalent.

8. A method for monitoring the depth of cells formed with parallel cell walls in the surface of a rotogravure cylinder and for signifying those cells which are of an improper depth, said method comprising the steps of:

scanning the rotogravure cylinder with an incident ultrasonic beam projected onto the cylinder surface in a plane substantially perpendicular to said cell walls;

measuring the intensity of the portion of said incident beam which is reflected backwardly substantially along and parallel to the incident beam and producing therefrom a first signal representative of the actual depth of the cells then being scanned, scanning a reference pattern having sensible characteristics thereover representative of desired cell depths for respectively corresponding areas of the rotogravure cylinder and producing a second signal corresponding thereto, synchronously comparing said first and second signals to produce a first output signal if the actual cell depth is substantially greater than the desired cell depth and a second output signal if the actual cell depth is substantially less than the desired cell depth, and indicating said first and second output signals in association with respectively corresponding areas of the rotogravure cylinder thereby enabling corrective action.

9. A method as in claim 8 wherein said indicating step comprises:

directly marking the said respectively corresponding areas of the rotogravure cylinder.

10. A method as in claim 9 wherein said directly marking step comprises:

spray marking the cylinder with a first color in response to said first output signal, and spray marking the cylinder with a second color, different from said first color, in response to said second output signal.

* * * * *